US010704526B2

(12) United States Patent
Kurita

(10) Patent No.: US 10,704,526 B2
(45) Date of Patent: Jul. 7, 2020

(54) VANED WHEEL FOR A TURBINE, AND POWER GENERATION DEVICE

(71) Applicant: Hidemi Kurita, Nagano (JP)

(72) Inventor: Hidemi Kurita, Nagano (JP)

( * ) Notice: Subject to any disclaimer, the term of this patent is extended or adjusted under 35 U.S.C. 154(b) by 188 days.

(21) Appl. No.: 15/739,537

(22) PCT Filed: Jun. 22, 2016

(86) PCT No.: PCT/JP2016/068541
§ 371 (c)(1),
(2) Date: Dec. 22, 2017

(87) PCT Pub. No.: WO2016/208632
PCT Pub. Date: Dec. 29, 2016

(65) Prior Publication Data
US 2018/0180018 A1    Jun. 28, 2018

(30) Foreign Application Priority Data

Jun. 25, 2015  (JP) .................................. 2015-127332

(51) Int. Cl.
*F03D 3/06* (2006.01)
*F03B 7/00* (2006.01)
(Continued)

(52) U.S. Cl.
CPC ................... *F03B 1/02* (2013.01); *F03B 1/00* (2013.01); *F03B 1/04* (2013.01); *F03B 7/003* (2013.01);
(Continued)

(58) Field of Classification Search
CPC ...... F01D 1/06; F03B 1/02; F03B 1/04; F03B 7/003; F03D 3/002; F05B 2210/16;
(Continued)

(56) References Cited

U.S. PATENT DOCUMENTS 1,485,649 A    3/1924  Leggelo
2,252,788 A    8/1941  Sparr
(Continued)

FOREIGN PATENT DOCUMENTS

EP    1 515 039 B1    8/2014
JP    57-135274 A     8/1982
(Continued)

OTHER PUBLICATIONS

International Search Report for PCT/JP2016/068541 (PCT/ISA/210) dated Sep. 13, 2016.

*Primary Examiner* — Ninh H. Nguyen
(74) *Attorney, Agent, or Firm* — Birch, Stewart, Kolasch & Birch, LLP

(57) ABSTRACT

Through dividing all blades into four or more blade groups including a certain number, which is three or more, of the blades, the blade located in the rearmost portion of each blade group in a direction of rotation is selected as a main blade, and remaining blades are selected as auxiliary blades, the length of each of the auxiliary blades is set to be shorter than the length of the main blade, and corresponding inner edge portions are positioned to the front, in the direction of rotation, of a normal line that passes through an outer edge portion of the blade, and an extension line of a chord line that connects the outer edge portion and the inner edge portion of the blade to one another are made to intersect with the main blade that is adjacent to the front in the direction of rotation.

17 Claims, 13 Drawing Sheets

(51) Int. Cl.
*F03B 1/02* (2006.01)
*F03D 3/00* (2006.01)
*F03B 1/00* (2006.01)
*F03B 1/04* (2006.01)

(52) U.S. Cl.
CPC ............ *F03D 3/002* (2013.01); *F03D 3/005* (2013.01); *F03D 3/061* (2013.01); *F03D 3/065* (2013.01); *F05B 2210/16* (2013.01); *F05B 2210/403* (2013.01); *F05B 2240/241* (2013.01); *F05B 2240/2411* (2013.01); *F05B 2250/82* (2013.01); *Y02E 10/223* (2013.01); *Y02E 10/74* (2013.01)

(58) Field of Classification Search
CPC .......... F05B 2210/403; F05B 2240/241; F05B 2240/2411
See application file for complete search history.

(56) References Cited

U.S. PATENT DOCUMENTS

| 4,936,288 | A  | * | 6/1990 | Lazard .................. F04D 17/167 126/299 D |
| 5,076,759 | A  | * | 12/1991 | Schonell ................. F03D 3/067 415/4.2 |
| 6,736,610 | B2 | * | 5/2004 | Cifarelli .............. A01M 7/0021 415/102 |
| 7,056,082 | B1 | * | 6/2006 | Taylor .................... F03D 3/005 415/4.2 |
| 7,094,017 | B2 | * | 8/2006 | Kurita .................. F03B 17/067 415/4.2 |
| 2006/0275105 | A1 | * | 12/2006 | Roberts .................. F03D 3/061 415/4.2 |

FOREIGN PATENT DOCUMENTS

| JP | 2009-19532 A | 1/2009 |
| JP | 2015-113775 A | 6/2015 |
| WO | WO 03/098035 A1 | 11/2003 |

* cited by examiner (a)

(b)

(c)

(d)

VANED WHEEL FOR A TURBINE, AND POWER GENERATION DEVICE

TECHNICAL FIELD

The present invention relates to a vaned wheel for a turbine, and a power generation device favorably used in wind power generation, hydropower generation, and other types of power generation that carry out small power generation.

BACKGROUND ART

Recently, small power generation systems that use the waterways and rivers and canals around us to generate hydropower, or use wind to generate wind power, have gathered attention. Further, the applicant of the present invention has already proposed a vertical axis drive device such as a vertical axis wind turbine, and a power generation device that uses the same, to be favorably used in such a small power generation system. This invention corresponds to Patent Literature 1.

The vertical axis drive device such as a vertical axis wind turbine and power generation device that uses the same disclosed in Patent Literature 1 are designed for the purpose of obtaining (in particular, at high load) an extremely large amount of output compared to a Savonius wind turbine, which is conventionally the most common practically used type of vertical axis wind turbine, and controlling rotation, to thereby automatically prevent damage to the wind turbine during strong winds without using external power. Specifically, the vertical axis drive device has a plurality of rotor blades configured to support a blade on a planetary axis, that are arranged evenly in a circumferential direction of a central axis, and are provided integrally with the central axis in a manner that allows rotational movement. In such a vertical axis drive device, each of the rotor blades is configured such that it forms a multi-point crossover arrangement in which a surface of the blade is oblique to a radial direction centered on the center axis.

CITATION LIST

Patent Literature

Patent Literature 1: WO 03/098035A1

SUMMARY OF INVENTION

Technical Problem

However, the above-mentioned conventional vertical axis drive device (power generation device) has the following problems that need to be solved.

Firstly, in power generation systems that use a turbine such as a water mill or a wind turbine to convert hydropower or wind power into electric power through energy conversion, figuring out how to effectively convert the power is a problem. In small power generation systems, in particular, this is a big problem because a small amount of electric power is generated. In this case, the geometric configuration of a vaned wheel configured to convert hydropower or wind power into rotational force through motion, and then output that rotational force, is an important technical element that improves the motion conversion efficiency. Vaned wheels in conventional small power generation systems do not necessarily consider a sufficient geometric configuration, and have further room for improvement in terms of improving the motion conversion efficiency.

Secondly, another important issue regarding vaned wheels in these types of small power generation systems is how to achieve downsizing, reduced weight, and lower cost when constructing the vaned wheel, while still ensuring motion conversion efficiency. In other words, there is a need to ensure downsizing, reduced weight, and lower cost, and improve the overall advantages of these characteristics, while at the same time ensuring the motion conversion efficiency. However, there is a tendency for vaned wheels in conventional small power generation systems to have a complicated structure, and hence there is further room for improvement in terms of achieving downsizing, reduced weight, and lower cost.

The present invention has an object to provide a vaned wheel for a turbine and a power generation device that solve the problems existing in the background art described above.

Solution to Problem

In order to solve the above-mentioned problems, a vaned wheel for a turbine 1 according to the present invention is characterized by including a rotation output axis 2 configured to output rotational force, and a fluid operating portion 3 including a plurality of blades 3p . . . fixed at positions on the rotation output axis 2, and disposed at predetermined intervals in a circumferential direction Ff around the rotation output axis 2, to which force of a fluid W that flows through the vaned wheel for a turbine 1 is imparted through making the plurality of blades face the fluid W, in which, when configuring the vaned wheel 1, outer edge portions 3po . . . of each of the blades 3p . . . are positioned on the same circle S as seen from an axial direction Fs of the rotation output axis 2, and are disposed at predetermined intervals Lc . . . along the circumferential direction Ff, and, through dividing all of the blades 3p . . . into at least four or more blade groups G1, G2 . . . that include a certain number, which is at least three or more, of the blades 3p . . . , the blade 3p located in a rearmost portion of each blade group G1 . . . in a direction of rotation Fr is selected as a main blade 3pm, and remaining blades 3p . . . are selected as auxiliary blades 3pa, 3pb . . . , the length of each of the auxiliary blades 3pa, 3pb . . . is set to be shorter than the length of the main blade 3pm, a corresponding inner edge portion 3pi . . . of each of the blades 3p . . . is positioned to the front, in the direction of rotation Fr, of a normal line Lv that passes through the outer edge portion 3po . . . of the blade 3p . . . , and an extension line Lge . . . of a chord line Lg . . . that connects the outer edge portion 3po . . . and the inner edge portion 3pi . . . of the blade 3p . . . to each other is set so as to intersect with the main blade 3pm that is adjacent to the front in the direction of rotation Fr.

On the other hand, a power generation device M according to the present invention is characterized by including the vaned wheel for a turbine 1 mentioned above; a power generator 10 to which rotational force of the rotation output axis 2 of the vaned wheel for a turbine 1 is imparted; and fluid supply means 11 configured to impart the force of the fluid W on the fluid operating portion 3 of the vaned wheel for a turbine 1.

Further, according to a preferred embodiment of the present invention, the force of the fluid W can include one of wind power and hydropower. On the other hand, when configuring the fluid operating portion 3, the length (distance from edge to edge) of each of the auxiliary blades 3pa, 3pb . . . in the blade group G1 . . . can be set to gradually become shorter as the auxiliary blade 3*pa*, 3*pb* . . . approaches the front in the direction of rotation Fr. It should be noted that the angle Rm formed between the normal line Lv that passes through the outer edge portion 3*pmo* of the main blade 3*pm*, and the chord line Lg of the main blade 3*pm* is desirably selected within a range of from 12° to 22°. Furthermore, the interval Lc . . . between the outer edge portions 3*po* . . . of the blades 3*p* . . . in the blade group G1 . . . can be set to be wider than the interval Li . . . between the corresponding inner edge portions 3*pi* . . . , and the angle Rs formed between the normal line Lv . . . that passes through the outer edge portion 3*pao* . . . of an arbitrary auxiliary blade 3*pa* . . . in the corresponding blade group G1 . . . , and the chord line Lg . . . of the arbitrary auxiliary blade 3*pa* . . . can be set to be larger than the angle Rm . . . formed between the normal line Lv . . . that passes through the outer edge portion 3*pmo* . . . of the main blade 3*pm* . . . in the corresponding blade group G1 . . . , and the chord line Lg . . . of the main blade 3*pm* . . . . Further, the shape of each of the blades 3*p* . . . as seen from the axial direction Fs of the rotation output axis 2 may be selected as a straight-line shape, or may be selected as a curved-line shape including only a curved line, or a combination of a curved line and a straight line, in which an intermediate position thereof is expanded forward in the direction of rotation Fr. It should be noted that the cross-section shape of the outer edge portion 3*po* . . . of the blade 3*p* . . . is desirably selected as a pointed shape or a round shape. Further, the fluid operating portion 3 can be used singularly, or configured as fluid operating portion units 31, 32 . . . , and a plurality of the fluid operating portion units 31, 32 . . . can be used by being coupled to one other on the same axis. In this case, the plurality of fluid operating portion units 31, 32 . . . is desirably disposed after making the relative phase angles thereof in the direction of rotation Fr differ from one another. On the other hand, the fluid operating portion 3 can be configured such that the blades 3*p* . . . are disposed between a pair of opposing support plates 21*p*, 21*q* formed into circles. In this case, the cross section of the outer peripheral edge of the support plates 21*p*, 21*q* is desirably formed into a pointed shape or a round shape. Further, a discharge nozzle 12 configured to discharge the fluid W can be used for the fluid supply means 11. In particular, a rectangular shape is selected for an injection port 12*e* of the discharge nozzle 12 and, more desirably, the tip end shape of the injection port 12*e* as seen from the axial direction Fs of the rotation output axis 2 is selected as an inclined shape that follows a rotation locus of each of the blades 3*p* . . . in the vaned wheel for a turbine 1.

Advantageous Effects of Invention

The vaned wheel for a turbine 1 and the power generation device M according to the present invention that have the above-described configuration provide the following significant effects.

(1) Through dividing all of the blades 3*p* . . . into the at least four or more blade groups G1, G2 . . . that include a certain number, which is at least three or more, of the blades 3*p* . . . , the blade 3*p* located in the rearmost portion of each blade group G1 . . . in the direction of rotation Fr is selected as the main blade 3*pm*, and the remaining blades 3*p* . . . are selected as the auxiliary blades 3*pa*, 3*pb* . . . , the length of each of the auxiliary blades 3*pa*, 3*pb* . . . is set to be shorter than the length of the main blade 3*pm*, the corresponding inner edge portion 3*pi* . . . of each of the blades 3*p* . . . is positioned to the front, in the direction of rotation Fr, of the normal line Lv of each of the blades 3*p* . . . , and the extension line Lge . . . of the chord line Lg . . . of each of the blades 3*p* . . . to each other is set so as to intersect with the main blade 3*pm* that is adjacent to the front in the direction of rotation Fr. Hence, when the blades 3*p* . . . are made to face the fluid W that flows therethrough, the force of the fluid W can be effectively received without generating any waste. Therefore, it is possible to further improve the motion conversion efficiency of the vaned wheel 1, and also the general power generation efficiency of the power generation device in terms of small power generation. It is also possible to construct a system that can also be efficiently used for uses other than power generation, such as water pumping and milling.

(2) In basic terms, the motion conversion efficiency of the vaned wheel 1 can be increased due to the geometric structure of the blades 3*p* . . . , and hence there is no need to add parts other than the fluid operating portion 3, which includes the plurality of blades 3*p* . . . , and hence the vaned wheel 1 can be formed with a smaller size, reduced weight, and lower cost without increasing the number of parts used.

(3) According to a preferred embodiment, the force of the fluid W can include any one of wind power and hydropower. Therefore, various types of the fluid W can be used when constructing the small power generation system, to thereby make it possible to provide a small power generation system with excellent versatility and ease of implementation.

(4) According to a preferred embodiment, when the length (distance from end to end) of each of the auxiliary blades 3*pa*, 3*pb* . . . in the blade group G1 . . . is set to gradually become shorter as the auxiliary blade 3*pa*, 3*pb* . . . approaches the front in the direction of rotation Fr, in particular, without being influenced by the shape and layout of the main blade 3*pm*, the fluid W can be smoothly discharged after colliding with each of the auxiliary blades 3*pa*, 3*pb* . . . , and the effectiveness of reusing the fluid W when has collided with the other blades 3*pm*, 3*pa*, 3*pb* . . . can be increased. Specifically, the fluid W that has collided with each of the auxiliary blades 3*pa*, 3*pb* . . . can be made to directly collide with the main blade 3*pm* that is adjacent to the front in the direction of rotation Fr, without being made to collide with each of the auxiliary blades 3*pa*, 3*pb* . . . , to thereby contribute to further improvement of the motion conversion efficiency.

(5) According to a preferred embodiment, when the angle Rm formed between the normal line Lv that passes through the outer edge portion 3*pmo* of the main blade 3*pm*, and the chord line Lg of the main blade 3*pm* is set within the range of from 12° to 22° when the fluid operating portion 3 is configured, the angle Rm can be optimized in terms of selecting the angle Rm for each of the blades 3*p* . . . , and hence the motion conversion efficiency can be further improved.

(6) According to a preferred embodiment, when setting the interval Li . . . between the inner edge portions 3*pi* . . . of the blades 3*p* . . . to be narrower than the interval Lc . . . between the corresponding outer edge portions 3*po* . . . , and setting the angle Rs . . . formed between the normal line Lv . . . that passes through the outer edge portion 3*pao* . . . of the arbitrary auxiliary blade 3*pa* . . . in the respective blade group G1 . . . , and the chord line Lg . . . of the arbitrary auxiliary blade 3*pa* . . . larger than the angle Rm . . . formed between the normal line Lv . . . that passes through the outer edge portion 3*pmo* . . . of the main blade 3*pm* . . . in the respective blade group G1 . . . , and the chord line Lg . . . of the main blade 3*pm* . . . , effectiveness can be improved in terms of reusing the fluid W that is discharged from the blade 3p . . . with which the fluid W first collided. Specifically, it is possible to cause the fluid W that is discharged from the blade 3p . . . with which the fluid W first collided to smoothly and concentratedly collide at a position at which a large amount of rotational force is generated in the main blade 3pm . . . that is adjacent to the front in the direction of rotation Fr, to thereby effectively reuse the fluid W. This configuration can contribute to further improving the motion conversion efficiency from the viewpoint of setting the positions and the angles of each of the blades 3p . . . .

(7) According to a preferred embodiment, when the shape of each of the blades 3p . . . as seen from the axial direction Fs of the rotation output axis 2 is selected as a straight-line shape, the present invention can be implemented with the simplest shape, and hence this embodiment provides an advantage in terms of reducing manufacturing costs.

(8) According to a preferred embodiment, when the shape of each of the blades 3p . . . as seen from the axial direction Fs of the rotation output axis 2 is selected as a curved shape that includes only a curved line, or a combination of a straight line and a curved line, in which an intermediate position thereof is expanded forward in the direction of rotation Fr, the shape can be optimized from the viewpoint of effectively taking in the force of the fluid W that flows therethrough when the fluid W collides, and hence this configuration can contribute to further improving the motion conversion efficiency from the aspect of setting the shapes of each of the blades 3p . . . .

(9) According to a preferred embodiment, when the cross-section shape of the outer edge portion 3po . . . of the blade 3p . . . is selected as a pointed shape or a round shape, unusable turbulence and dispersion generated when the fluid W collides can be reduced, and hence the motion conversion efficiency can be further improved from the aspect of setting the tip end shape of the blades 3p . . . .

(10) According to a preferred embodiment, when the fluid operating portion 3 is used singularly, the vaned wheel 1 can be implemented at low cost with the simplest embodiment, to thereby make it possible to provide the power generation device M at low cost.

(11) According to a preferred embodiment, when forming the fluid operating portion 3 as the fluid operating portion units 31, 32 . . . , and using the plurality of fluid operating portion units 31, 32 . . . by coupling them to one another on the same axis, it is possible to prepare a plurality of standard fluid operating portion units 31 . . . , and to realize combinations of an arbitrary number of the fluid operating portion units 31 . . . , to thereby obtain, easily and at low cost, various types of power generation devices M . . . based on the magnitude of their power generating capability.

(12) According to a preferred embodiment, when disposing the fluid operating units 31, 32 . . . after making the relative phase angles thereof in the direction of rotation Fr differ from one another, it is possible to substantially increase the number of main blades 3pm . . . , and reduce the force imparted on the main blades 3pm . . . by the fluid W during each collision, to thereby generate smooth rotational force. This configuration can contribute to further improving the motion conversion efficiency, and reducing noise and vibration.

(13) According to a preferred embodiment, when forming the fluid operating unit 3 by disposing the blades 3p . . . between the pair of opposing support plates 21p, 21q formed as circles, it is possible for the support plates 21p, 21q to have a support function of supporting the blades 3p . . . , as well as reduce unusable scattering when the fluid W collides, to thereby contribute to improving the motion conversion efficiency.

(14) According to a preferred embodiment, when forming the cross-section of the outer peripheral edges of the support plates 21p, 21q of the fluid operating portion 3 into a pointed shape or a round shape, it is possible to further reduce unusable turbulence and scattering when the fluid W collides, to thereby contribute to preventing unnecessary reduction of the motion conversion efficiency.

(15) According to a preferred embodiment, when using the discharge nozzle 12 configured to discharge the fluid W for the fluid imparting means 11, it is possible to securely and effectively impart the intended fluid W to the target position in the vaned wheel for a turbine 1.

(16) According to a preferred embodiment, when a rectangular shape is selected as the injection port 12e of the discharge nozzle 12, it is possible to select the shape of the injection port 12e from the viewpoint of improving the motion conversion efficiency when converting the force into the rotary motion of the vaned wheel 1 when the fluid W collides with the blades 3p . . . . Therefore, it is possible to optimize the shape of the injection port 12e from the viewpoint of converting motion between the fluid W and the vaned wheel 1.

(17) According to a preferred embodiment, when selecting the tip end shape of the injection port 12e as seen from the axial direction Fs of the rotation output axis 2 as an inclined shape that follows a rotation locus of each of the blades 3p . . . in the vaned wheel for a turbine 1, it is possible to bring a fully open surface of the injection port 12e close to the vaned wheel for a turbine 1, to thereby reduce energy loss due to air resistance or other factors of the fluid W after the fluid W is discharged from the discharge nozzle 12, and contribute to further increasing the motion conversion efficiency.

REFERENCE SIGNS LIST

1: vaned wheel for a turbine, 2: rotation output axis, 3: fluid operating portion, $3p$ . . . : blade, $3po$ . . . : outer edge portion of blade, $3pi$ . . . : inner edge portion of blade, $3pm$: main blade, $3pa$ . . . : auxiliary blade, $3pmo$: outer edge portion of main blade, $3pao$ . . . : outer edge portion of auxiliary blade, 10: power generator, 11: fluid imparting means, 12: discharge nozzle, $12e$: injection port of discharge nozzle, 31: fluid operating portion unit, 32: fluid operating portion unit, Ff: circumferential direction, Fr: direction of rotation, Fs: axial direction, Lc . . . : predetermined interval (interval between outer edge portions), Li . . . : interval between inner edge portions, Lv . . . : normal line, Lg . . . : chord line, Lge . . . : extension line of chord line, W: fluid, S: same circle, G1 . . . : blade group, M: power generation device, Rm: angle formed between normal line and chord line, Rs . . . : angle formed between normal line and chord line.

DESCRIPTION OF EMBODIMENTS

Next, the best embodiment of the present invention is described in detail with reference to the drawings.

First, a basic configuration of a vaned wheel for a turbine 1 according to the embodiment of the present invention is described with reference to FIG. 1 and FIG. 2.

Figure 1:
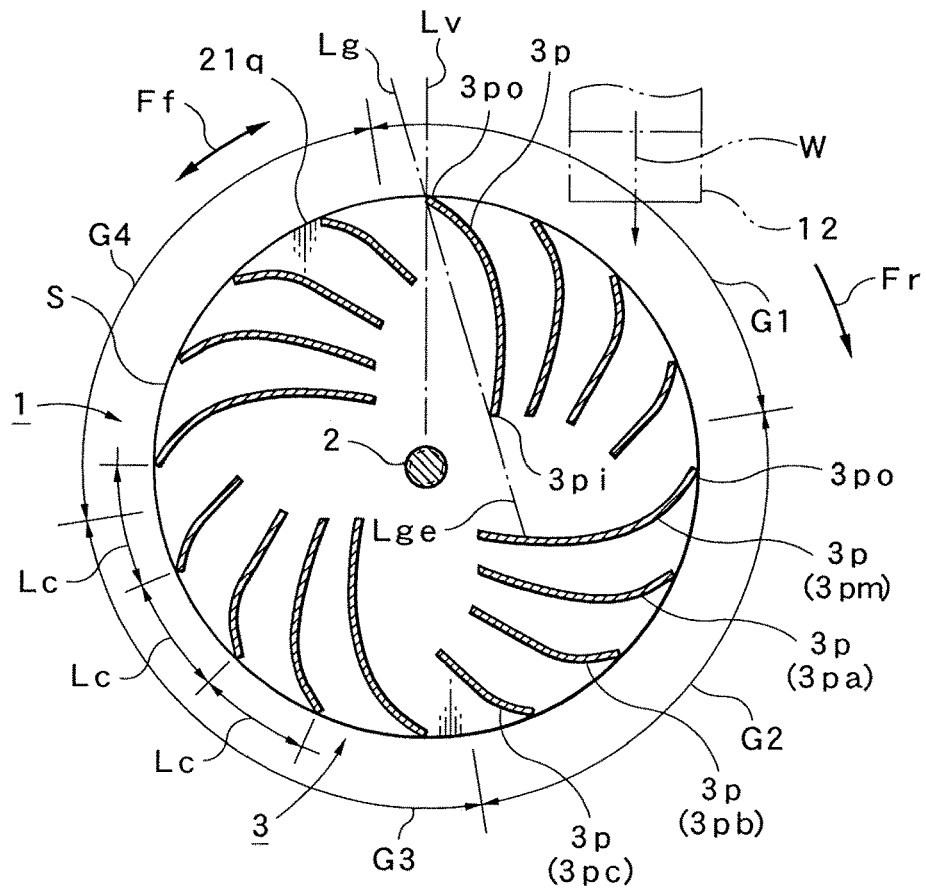
FIG. 1 is a cross-section plane view illustrating a vaned wheel for a turbine according to a preferred embodiment of the present invention.
Figure 2:
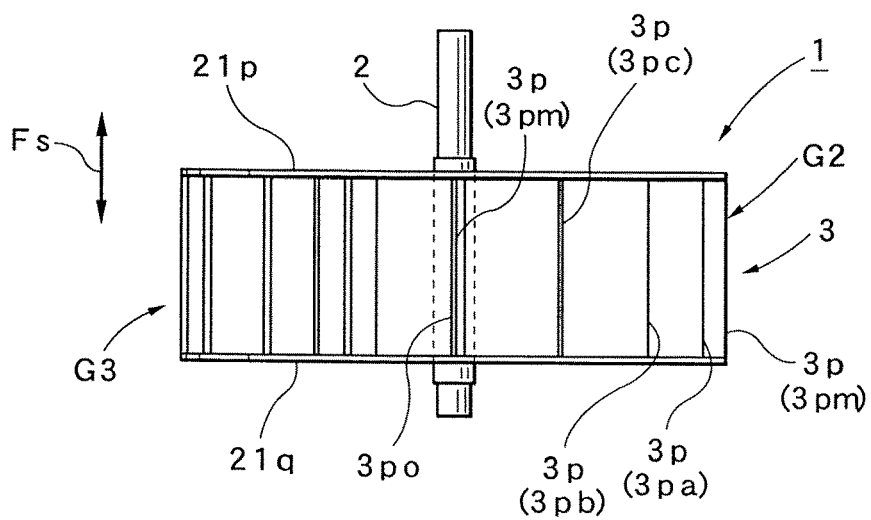
FIG. 2 is a front view illustrating the vaned wheel for a turbine.

As illustrated in FIG. 1 and FIG. 2, the vaned wheel for a turbine 1 includes, as a basic configuration, a rotation output axis 2, and a fluid operating portion 3 that is integral with the rotation output axis 2. The fluid operating portion 3 includes a plurality of blades $3p$ . . . disposed at predetermined intervals (at equal intervals in the illustrated example) Lc . . . in a circumferential direction Ff around the rotation output axis 2, and a pair of opposing support plates $21p$, $21q$ formed into circles configured to support (fix) both end sides of the blades $3p$ . . . in the axial direction Fs. Therefore, each of the support plates $21p$, $21q$ forms a right angle with the rotation output axis 2, and the rotation output axis 2 is fixed to each of the support plates $21p$, $21q$ while passing through the center of each of the support plates $21p$, $21q$. With this configuration, the vaned wheel for a turbine 1 is configured such that, by causing the fluid operating portion 3 to face fluid W that flows therethrough, force of the fluid W is imparted on the blades $3p$ . . . and, because the blades $3p$ . . . revolve around the rotation output axis 2, that force can be output as rotational force of the rotation output axis 2. In this case, because the fluid operating portion 3 includes the blades $3p$ . . . disposed between the pair of opposing support plates $21p$, $21q$ formed into circles, the support plates $21p$, $21q$ have a support function of supporting the blades $3p$ . . . , as well as reduce unusable scattering when the fluid W collides, and hence can contribute to improving motion conversion efficiency.

The vaned wheel for a turbine 1 configured as described above is basically implemented by the geometric configuration of each of the blades $3p$ . . . , and hence there is no need to add parts other than the fluid operating portion 3, which includes the plurality of blades $3p$ . . . . Therefore, the vaned wheel 1 can be formed with a smaller size, reduced weight, and lower cost without increasing the number of parts used. Further, as described later, motion conversion efficiency in the vaned wheel 1 can be further increased simultaneously.

Next, a detailed configuration of the vaned wheel for a turbine 1 having the basic configuration described above is described in detail with reference to FIG. 1 to FIG. 11.

As illustrated in FIG. 1, the illustrated vaned wheel for a turbine 1 uses a total of 16 blades $3p$ . . . . Each of these 16 blades $3p$ . . . has an outer edge portion $3po$ . . . of each of the blades $3p$ . . . positioned, as seen from an axial direction Fs of the rotation output axis 2, on the same circle S, that is, on an outer peripheral edge (or in the vicinity thereof) of the support plates $21p$, $21q$ formed into circles, and is disposed at predetermined intervals (equal intervals) Lc . . . along the circumferential direction Ff. Further, all the blades $3p$ . . . (16 blades) are divided into at least four (four are illustrated in the drawing) or more blade groups G1, G2, G3, G4 that include a certain number, which is three or more (four are illustrated in the drawing), of blades $3p$ . . . .

Figure 3:
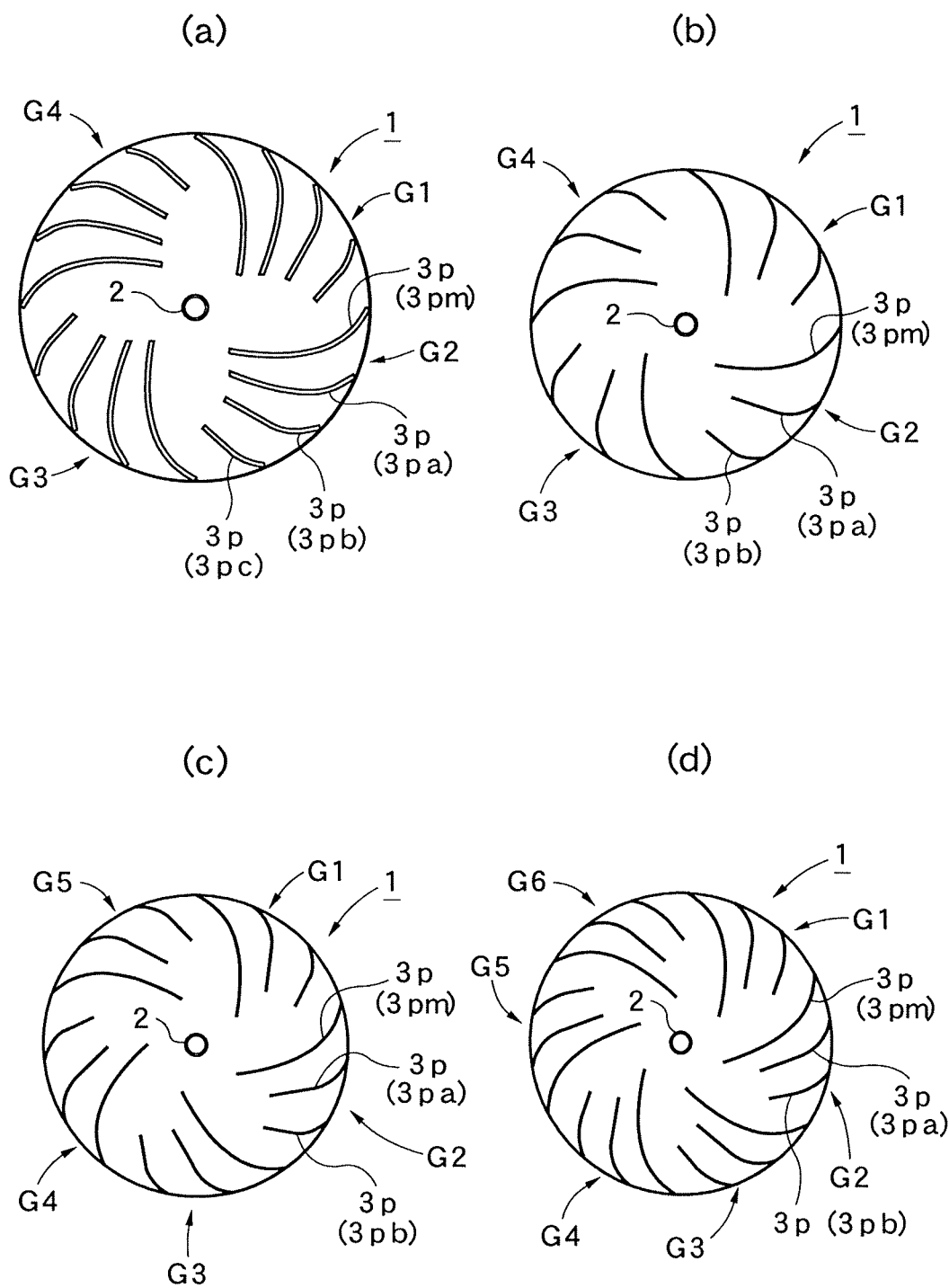
FIG. 3 is a schematic view illustrating various embodiments in which the number of blades per group, and the number of groups in the vaned wheel for a turbine have been modified.
Figure 4:
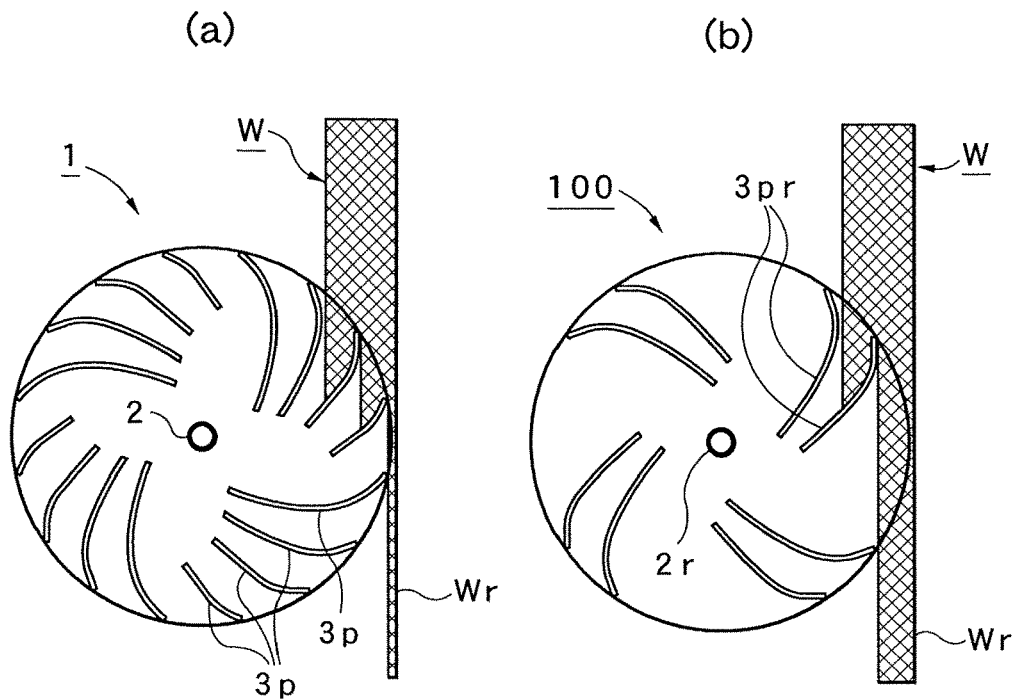
FIG. 4 is an explanatory view for explaining operation in a case in which the number of blades in the vaned wheel for a turbine is changed.

Therefore, the number of blade groups G1 . . . and the number of blades $3p$ . . . included in each of the blade groups G1 . . . can be implemented through various embodiments, as illustrated in FIG. 3. FIG. 3(b) illustrates a configuration example in which a total of 12 blades $3p$ . . . are used, and there are four blade groups G1 . . . G4, in which each group G1 . . . includes three blades $3p$ . . . . FIG. 3(c) illustrates a configuration example in which a total of 15 blades $3p$ . . . are used, and there are five blade groups G1 . . . G5, in which each group G1 . . . includes three blades $3p$ . . . . FIG. 3(d) illustrates a configuration example in which a total of 18 blades $3p$ . . . are used, and there are six blade groups G1 . . . G6, in which each group G1 . . . includes three blades $3p$ . . . . It should be noted that FIG. 3(a) is identical to FIG. 1, and is merely shown for comparison. That is, FIG. 3(a) illustrates a basic example in which a total of 16 blades $3p$ . . . are used, and there are four blade groups G1 . . . G4, in which each group G1 . . . includes four blades $3p$ . . . .

By adhering to the conditions described above, at least 12 blades $3p$ . . . can be ensured as the total number of blades 3p . . . , and hence, when the fluid W acts upon (collides with) a certain position in the vaned wheel 1, as illustrated in FIG. 4(a), useless fluid Wr that does not contribute to motion conversion is hardly generated. Note that FIG. 4(b) illustrates a conventional vaned wheel 100 disclosed in Patent Literature 1 that, in this case, generates the useless fluid Wr that does not contribute to motion conversion at a high rate. Also note that, in FIG. 4(b), 3pr denotes a blade, and 2r denotes a rotation output axis.

In either one of FIGS. 4(a) and 4(b), when the position at which the fluid W collides with the vaned wheel for a turbine 1 is moved toward the rotation output axis 2, the useless fluid Wr that does not contribute to motion conversion can be eliminated. On the contrary, the motion conversion efficiency decreases. In other words, in the case of FIG. 4(b), the motion conversion efficiency decreases even when the position at which the fluid W collides with the vaned wheel 1 is moved toward the rotation output axis 2 in order to eliminate the useless fluid Wr. Therefore, in order to extract the energy of the fluid W as rotational energy of the rotation output axis 2 to the furthest extent possible, there is a need to eliminate, or reduce as much as possible, the useless fluid Wr that does not contribute to motion conversion, and select a position closer to the outer periphery as the position at which the fluid W collides with the vaned wheel 1. In order to do this, the number of blades 3p . . . in the vaned wheel 1 must be increased.

Figure 5:
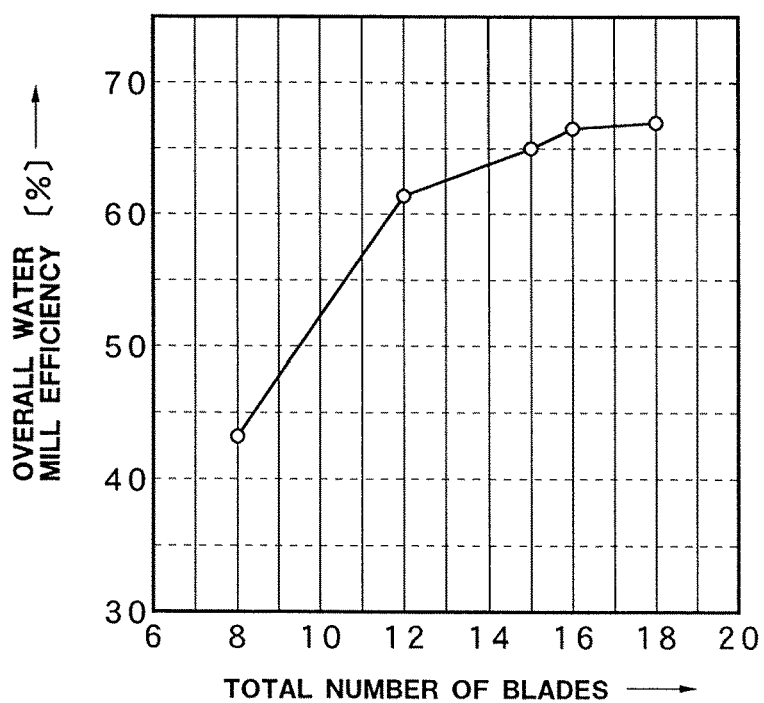
FIG. 5 is a correlation chart showing a relationship between the total number of blades and overall water mill efficiency in the vaned wheel for a turbine.
Figure 6:
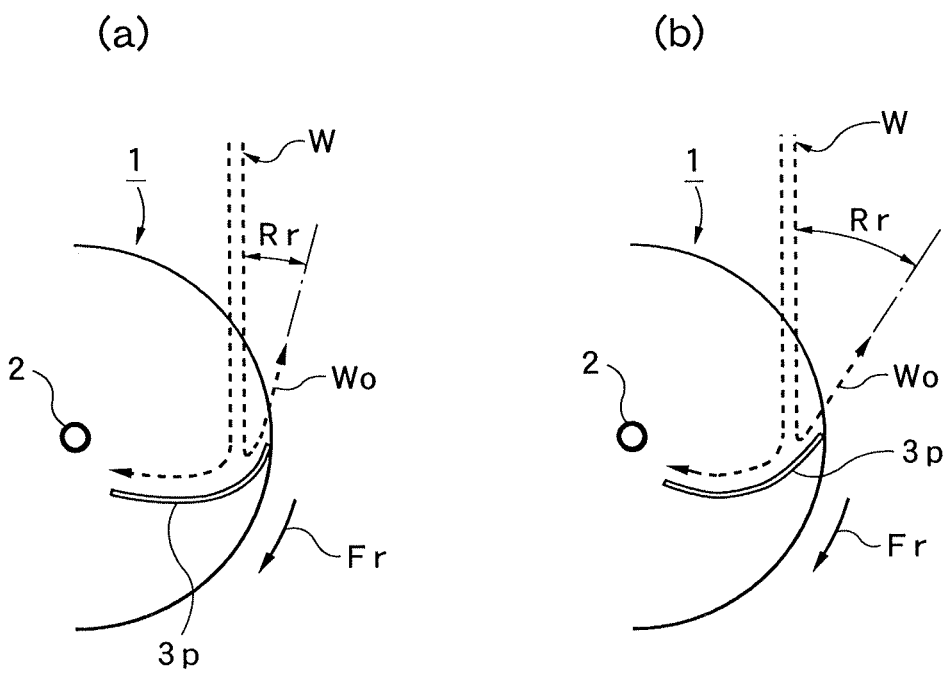
FIG. 6 is an explanatory view for explaining operation in a case in which the shape of blades in the vaned wheel for a turbine is changed.

FIG. 5 illustrates a relationship between the total number of blades in the vaned wheel for a turbine 1, and the overall efficiency (overall water mill efficiency) when the vaned wheel for a turbine 1 is used as a water mill. When the total number of blades is eight, the overall water mill efficiency is around 44%. When the total number of blades is 12, the overall water mill efficiency is around 61%. When the total number of blades is 15, the overall water mill efficiency is around 65% to 69%. As evident from the above, the overall water mill efficiency increases as the total number of blades increases. Note that the degree at which the overall water mill efficiency increases gradually slows down, and, in particular, is very small at 15 or more blades.

Further, the basic shape of one blade 3p is formed as follows. The blade 3p illustrated in FIG. 1 has a shape, as seen from the axial direction Fs of 2, formed of only a curved line, and is selected as a curved-line shape in which the intermediate position thereof is expanded forward in the direction of rotation Fr. In this case, in particular, the curved-line shape is selected such that the curvature radius of the outer side thereof is made smaller, and the curvature radius of the inner side thereof is made larger. Through forming the shape of the blade 3p in this way, as illustrated in FIG. 6(a), it is possible to reduce a flow-out angle Rr of fluid Wo that rebounds to the outer side when the fluid W collides with the certain position in the vaned wheel 1. It is known that force imparted on the vaned wheel 1 increases as the flow-out angle Rr becomes smaller. Note that FIG. 6(b) illustrates a case in which the blade 3p has an arc shape with a constant curvature radius and, in the case of the illustrated example, the flow-out angle Rr of the fluid Wo that rebounds to the outer side is larger than that in the case illustrated in FIG. 6(a).

Figure 7:
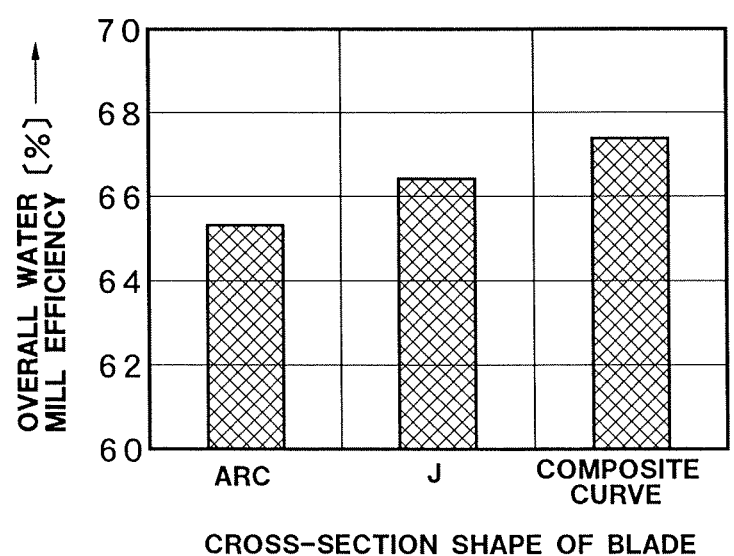
FIG. 7 is a characteristic graph showing vaned wheel conversion efficiency against a cross-section shape of the blades in the vaned wheel for a turbine.
Figure 8:
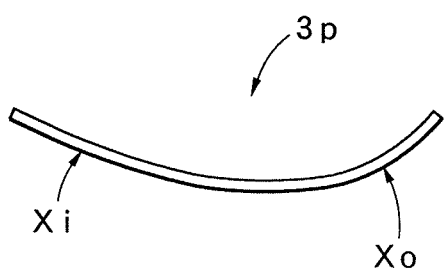
FIG. 8 is a schematic diagram illustrating various modification examples of the shape of the blades in the vaned wheel for a turbine.
Figure 8:
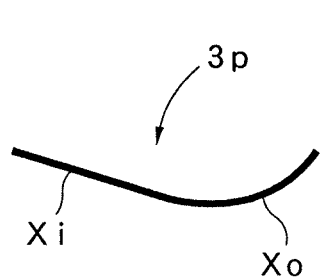
Figure 8:
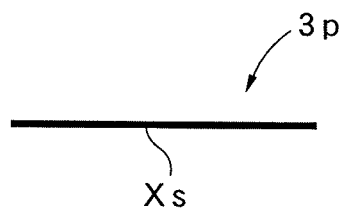
Figure 8:
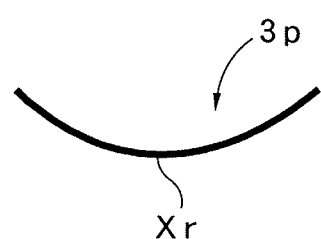

The shape of the blades 3p . . . illustrated in FIG. 1 is an example of a composite curve type of blade. The shape of the blades 3p . . . can be implemented through other various shapes, such as those illustrated in FIG. 8. FIG. 8(b) illustrates a J-type, in which the outer side is an arc shape Xo with a constant curvature radius, and the inner side is a straight-line shape Xi. FIG. 8(c) illustrates a straight-line type having an entirely straight-line shape Xs. FIG. 8(d) illustrates an arc type having an arc shape Xr in which the entire curvature radius is constant. FIG. 8(a) is provided for comparison, and illustrates a blade 3p formed under the same conditions as those in FIG. 1, that is, a blade 3p having a composite curve type in which the outer side has the arc shape Xo having a small curvature radius, and the inner side has the arc shape Xi having a large curvature radius. FIG. 7 shows characteristics of vaned wheel motion conversion against a cross-section shape of the blade 3p. As evident from the above, the composite curve type produced the most favorable results. The J-type produced the next most favorable results, and the arc type produced the next most favorable results after the J-type.

As described above, selecting a curved line shape including only a curved line, or a combination of a curved line and a straight line, and having the intermediate position thereof expanded forward in the direction of rotation Fr as the shape of each of the blades 3p . . . , as seen from the axial direction Fs of the rotation output axis 2, achieves optimization from the viewpoint of effectively incorporating the force generated when the fluid W that flows therethrough collides. Therefore, this configuration can contribute to further improving the motion conversion efficiency in terms of setting the shape of each of the blades 3p . . . . Note that selecting the straight-line shape as the shape of each of the blades 3p . . . , as seen from the axial direction Fs of the rotation output axis 2, makes it possible to implement the present invention with the simplest blade shape, and hence can provide an advantage in terms of reducing manufacturing costs.

Figure 9:
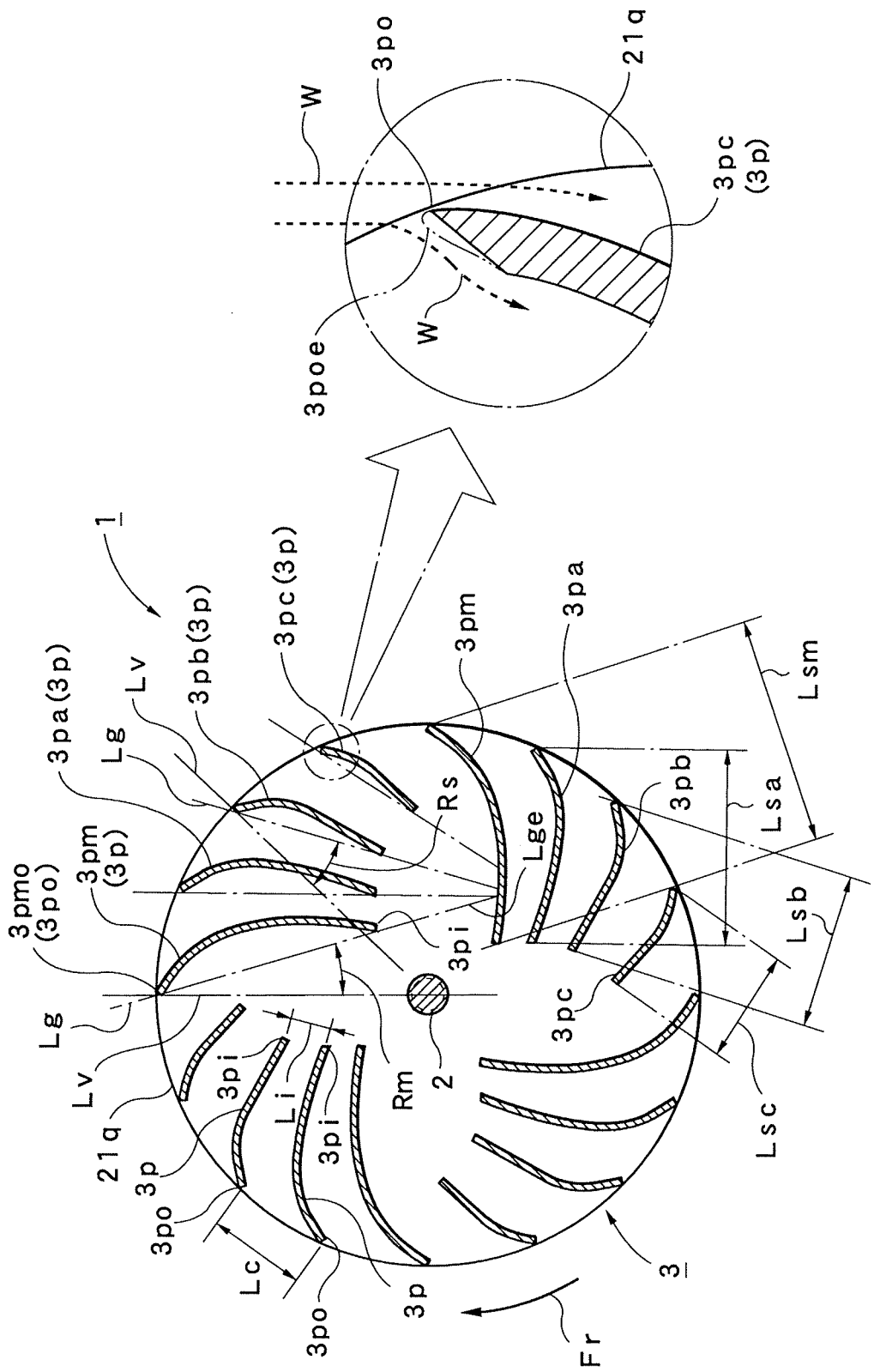
FIG. 9 is an explanatory diagram for explaining the principle of the vaned wheel for a turbine including an extracted enlarged cross-section of a outer edge portion of the blade in the vaned wheel.

Further, as illustrated in the extracted enlarged view of FIG. 9, the cross-section shape of the outer edge portions 3po . . . of the blades 3p . . . is formed into a pointed shape. With this configuration, it is possible to reduce unusable turbulence and scattering when the fluid W collides, and there is an advantage of contributing to further improving the motion conversion efficiency in terms of setting the tip end shape of the blades 3p . . . . Note that, as indicated by a virtual line 3poe, the cross-section shape of the outer edge portion 3po of the blade 3p can obtain the same effect even when formed into a round shape.

On the other hand, as illustrated in FIG. 1, the blade 3p located in the rearmost position in the direction of rotation Fr among blades 3p . . . in a blade group G2 (which is the same as the blade groups G1, G3, G4) is selected as a main blade 3pm, and the remaining three blades 3p . . . are selected as auxiliary blades 3pa, 3pb, 3pc. In this case, the length of each of the auxiliary blades 3pa, 3pb . . . is set shorter than the length of the main blade 3pm, and the length (distance from end to end) of each of the auxiliary blades 3pa, 3pb, 3pc in the blade group G2 is desirably set to gradually become shorter as the auxiliary blade 3pa, 3pb, 3pc approaches the front in the direction of rotation Fr. Specifically, as illustrated in FIG. 9, a length Lsa of the auxiliary blade 3pa is set shorter than a length Lsm of the main blade 3pm, a length Lsb of the auxiliary blade 3pb is set shorter than the length Lsa of the auxiliary blade 3pa, and a length Lsc of the auxiliary blade 3pc is set shorter than the length Lsb of the auxiliary blade 3pb. Through setting the lengths as described above, in particular, without being influenced by the shape and layout of the main blade 3pm, the fluid W can be smoothly discharged after colliding with each of the auxiliary blades 3pa, 3pb . . . , and the effectiveness of reusing the fluid W when it has collided with the other blades 3pm, 3pa, 3pb . . . can be increased. Specifically, the fluid W that has collided with each of the auxiliary blades 3pa, 3pb . . . can be made to directly collide with the main blade 3pm that is adjacent to the front in the direction of rotation Fr, without being made to collide with each of the auxiliary blades 3pa, 3pb . . . , to thereby advantageously contribute to further improvement of the motion conversion efficiency.

In this case, as illustrated in FIG. 9, a corresponding inner edge portion 3pi . . . is positioned to the front, in the direction of rotation Fr, of a normal line Lv that passes through the outer edge portion 3po . . . of the blade 3p . . . , and an extension line Lge . . . of a chord line Lg . . . that connects the outer edge portion 3po . . . and the inner edge portion 3pi . . . of the blade 3p . . . to each other is set so as to intersect with the main blade 3pm that is adjacent to the front in the direction of rotation Fr.

Figure 10:
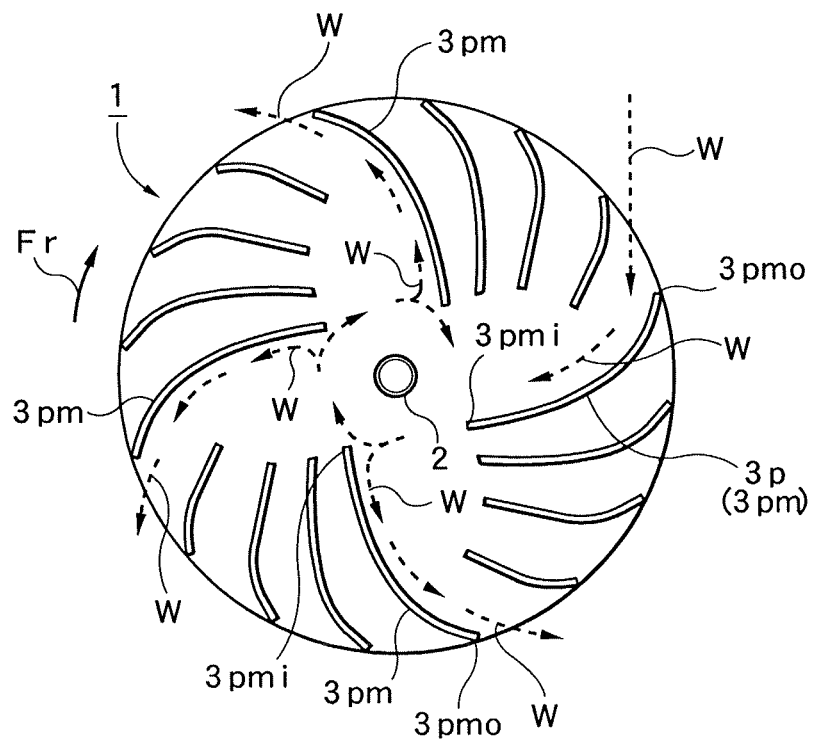
FIG. 10 is an explanatory diagram for explaining operation when fluid collides with main blades in the vaned wheel for a turbine.
Figure 11:
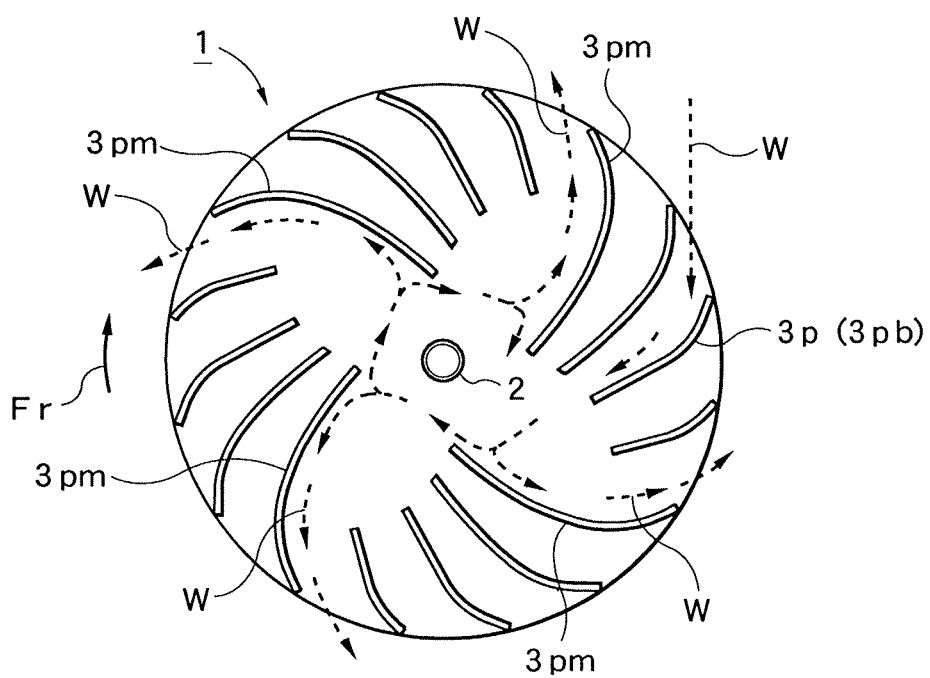
FIG. 11 is an explanatory diagram for explaining operation when fluid collides with auxiliary blades in the vaned wheel for a turbine.

With the above-mentioned configuration, as illustrated in FIG. 10, when the fluid W collides with the main blade 3pm, the fluid W flows along that main blade 3pm, and then flows out from that main blade 3pm. The fluid W then collides with the next main blade 3pm located to the front in the direction of rotation Fr from a direction that intersects with that main blade 3pm. The collision of the fluid W acts as secondary hydropower that rotates the vaned wheel 1. In this operation, the following is repeated: some of the fluid W is discharged to the outside after flowing toward the outer edge portion 3pmo along the main blade 3pm, and the remainder of the fluid W further collides with the next main blade 3pm located to the front in the direction of rotation Fr from a direction that intersects with the main blade 3pm. Further, as illustrated in FIG. 11, the same applies when the fluid W collides with the auxiliary blades 3pa . . . (3pb is illustrated in the figure) and, when the fluid W collides with the auxiliary blade 3pb, the fluid W flows along the auxiliary blade 3pb, and is then discharged from the auxiliary blade 3pb, to thereby collide with the next main blade 3pm located to the front in the direction of rotation Fr from a direction that intersects with the main blade 3pm. The collision of this fluid W acts as secondary hydropower that rotates the vaned wheel 1. In this operation, the following is repeated: some of the fluid W is discharged to the outside after flowing toward the outer edge portion 3pmo along the main blade 3pm, and the remainder of the fluid W further collides with the next main blade 3pm located to the front in the direction of rotation Fr from a direction that intersects with the main blade 3pm.

Figure 12:
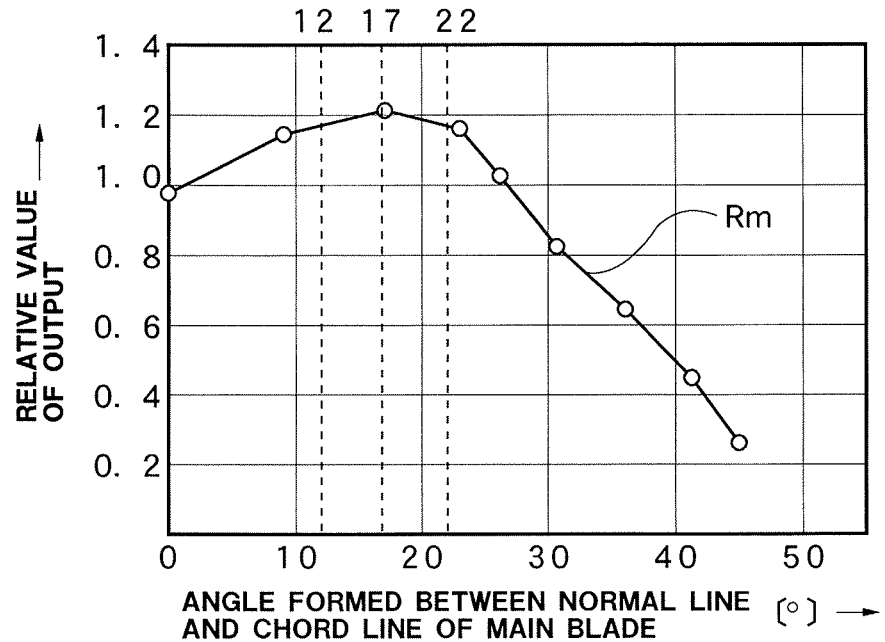
FIG. 12 is a characteristic graph showing relative value of output against an angle formed between a normal line and a chord line of the main blade in the vaned wheel for a turbine.

Further, as illustrated in FIG. 9, the angle Rm formed between the normal line Lv that passes through the outer edge portion 3pmo of the main blade 3pm, and the chord line Lg of that main blade 3pm is selected within a range of from 12° to 22°, desirably selected at around 17°. The reason for setting the angle Rm in this way is described with reference to FIG. 12. FIG. 12 illustrates the characteristics of a relative value of output against the angle Rm formed between the normal line Lv and the chord line Lg of the main blade 3pm of the vaned wheel 1. Through varying the size of the angle Rm, the relative value of output also varies and, as is evident from FIG. 12, the range of from around 12° to 22° is favorable, and around 17° is most favorable. Therefore, setting the angle Rm formed between the normal line Lv that passes through the outer edge portion 3pmo of the main blade 3pm, and the chord line Lg of the main blade 3pm within the range of from 12° to 22° makes it possible to optimize the angle Rm from the viewpoint of selecting the angle Rm of each of the blades 3p . . . , and hence provides an advantage of further improving the motion conversion efficiency.

Further, as illustrated in FIG. 9, the interval Li . . . between the inner edge portions 3pi . . . of the blades 3p . . . are set narrower than an interval Lc . . . between corresponding outer edge portions 3po . . . . Further, for arbitrary auxiliary blades 3pa . . . in each of the blade groups G1 . . . , for example, for the auxiliary blade 3pb, an angle Rs formed between the normal line Lv in the auxiliary blade 3pb, and the chord line Lg of the auxiliary blade 3pb is set larger than the angle Rm formed between the normal line Lv in the outer edge portion 3pmo of the main blade 3pm in the blade group G1, and the chord line Lg of the main blade 3pm.

Through setting the angle sizes in this way, effectiveness can be improved in terms of reusing the fluid W that is discharged from the blade 3p . . . with which the fluid W first collided. Specifically, it is possible to cause the fluid W that is discharged from the blade 3p . . . with which the fluid W first collided to smoothly and concentratedly collide at a position at which a large amount of rotational force is generated in the main blade 3pm . . . that is adjacent to the front in the direction of rotation Fr, to thereby effectively reuse the fluid W. This configuration can contribute to further improving the motion conversion efficiency from the viewpoint of setting the positions and angles of each of the blades 3p . . . .

Therefore, according to the vaned wheel for a turbine 1 according this embodiment, as a basic configuration, the outer edge portions 3po . . . of each of the blades 3p . . . are positioned on the same circle S, and are disposed at predetermined intervals Lc . . . along the circumferential direction Ff, and through dividing all of the blades 3p . . . into at least four or more blade groups G1, G2 . . . that include a certain number, which is at least three or more, of the blades 3p . . . , the blade 3p located in the rearmost portion of each blade group G1 . . . in the direction of rotation Fr is selected as the main blade 3pm, the remaining blades 3p . . . are selected as the auxiliary blades 3pa, 3pb . . . , the length of each of the auxiliary blades 3pa, 3pb . . . is set to be shorter than the length of the main blade 3pm, and a corresponding inner edge portion 3pi . . . of each of the blades 3p . . . is positioned to the front, in the direction of rotation Fr, of the normal line Lv . . . that passes through the outer edge portion 3po . . . , and the extension line Lge . . . of the chord line Lg . . . that connects the outer edge portion 3po . . . and the inner edge portion 3pi . . . of the blade 3p . . . is set so as to intersect with the main blade 3pm that is adjacent to the front in the direction of rotation Fr, and hence, when the blades 3p . . . are made to face the fluid W that flows therethrough, the force of the fluid W can be effectively received without generating any waste. Therefore, it is possible to further improve the motion conversion efficiency of the vaned wheel 1, and the overall power generating efficiency of the power generation device in terms of small power generation, as well as construct a system that can also be efficiently used for uses other than power generation, such as water pumping and milling.

Next, a power generation device M according to the present embodiment that uses the vaned wheel for a turbine 1 is described with reference to FIG. 13 to FIG. 17.

Figure 14:
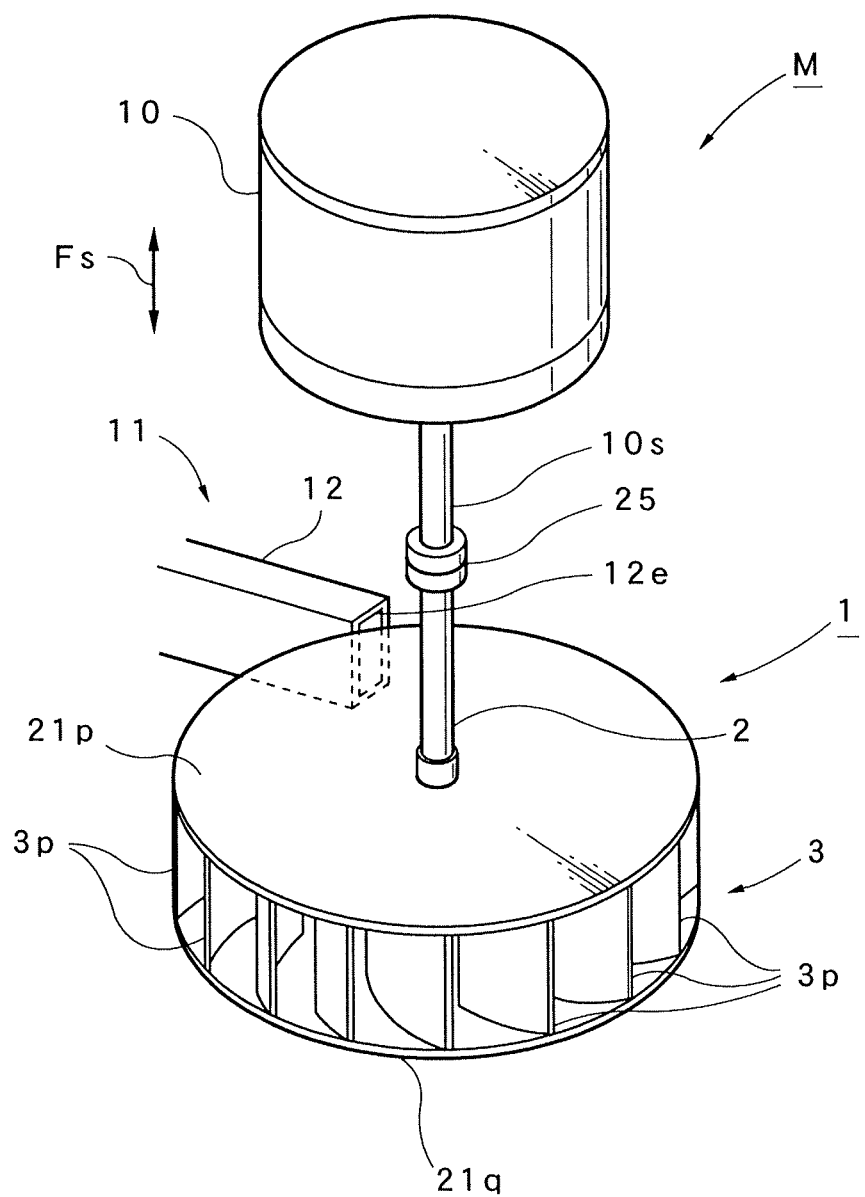
FIG. 14 is an external perspective diagram illustrating the entire configuration of the power generation device using the vaned wheel for a turbine.

As illustrated in FIG. 14, the power generation device M according to the present embodiment includes the above-mentioned vaned wheel for a turbine 1, a power generator 10 coupled to the rotation output axis 2 of the vaned wheel for a turbine 1 by being coupled to a rotation input shaft 10s via a coupling 25, to which rotational force of the rotation output axis 2 of the vaned wheel for a turbine 1 is imparted, and fluid supply means 11 configured to act on the fluid W that flows through, and impart the force of the fluid W on a certain position of the fluid operating portion 3 of the vaned wheel for a turbine 1.

In this case, as described in the modification example described below, the vaned wheel for a turbine 1 can be configured by a combination of the plurality of fluid operating portion units 31, 32 . . . (see FIG. 18) coupled to one another on the same axis. The vaned wheel for a turbine 1 illustrated in FIG. 14 is an example of a case in which a single fluid operating portion 3 is used. Through using a single fluid operating portion 3 in this way, the vaned wheel 1 can be implemented with the simplest embodiment, at low cost, and hence this configuration is advantageous because the power generation device M can be provided at low cost.

Figure 15:
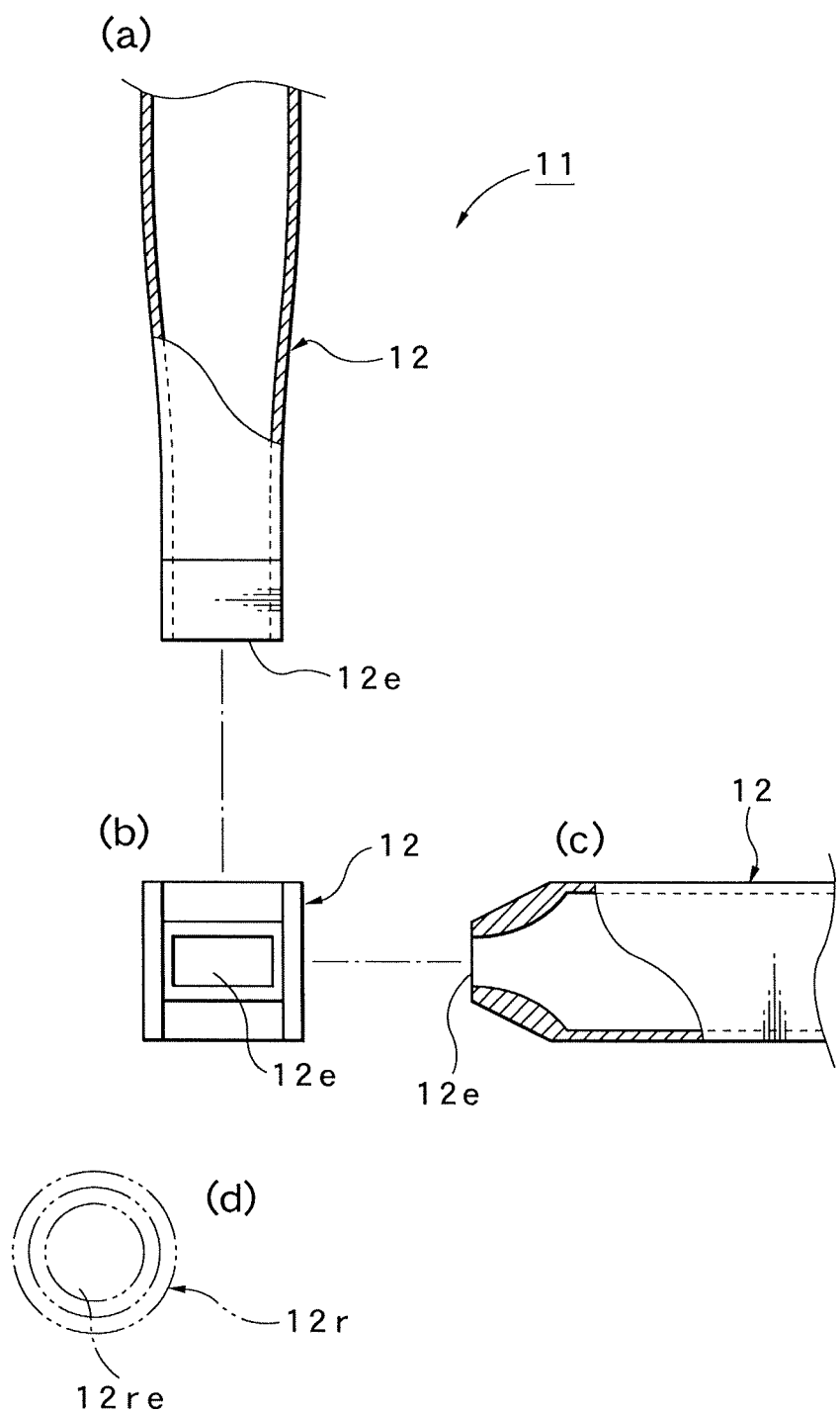
FIG. 15 is a three-plane view including a partial cross-section illustrating a discharge nozzle of the power generation device using the vaned wheel for a turbine.

Further, the power generator 10 is not limited to a particular power generator, and any various type of known power generator having a function of converting rotational input into electrical output can be used for the power generator 10. Further, the fluid imparting means 11 desirably uses the discharge nozzle 12 illustrated in FIG. 14. In the case of the illustrated example, the discharge nozzle 12 has a function of discharging water (river water or the like) as the fluid W and, in particular, a rectangular shape is selected as the injection port 12e of the discharge nozzle 12. In FIG. 15, (a) is a partial cross-section plane view of the discharge nozzle 12, (b) is a front view of the same, (c) is a partial cross-section side view of the same, and (d) illustrates, by virtual lines, a conventional discharge nozzle 12r in which an injection port 12re has a circular shape for comparison. The discharge nozzle 12 of the illustrated example discharges water (river water or the like) as the fluid W, but the present invention may be similarly implemented through discharging wind (air) as the fluid W. As described above, in the vaned wheel for a turbine 1, water or wind may be used as the fluid W, that is, either wind power or hydropower may be used as the force of the fluid W, and hence the present invention may be implemented with many different types of the fluid W when constructing the small power generation system, and hence a small power generation system having excellent versatility and ease of implementation can be provided.

Figure 16:
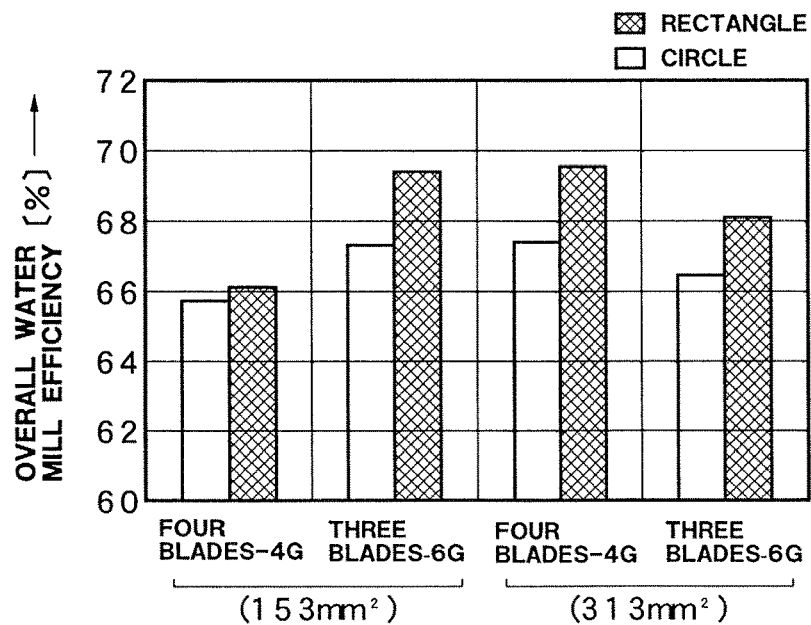
FIG. 16 is a characteristic graph showing vaned wheel conversion efficiency against cross-section shape and cross-section area of the discharge nozzle of the vaned wheel for a turbine.

FIG. 16 shows results obtained through empirically determining a relationship between the conversion efficiency of the vaned wheel 1, and different combinations of shapes (rectangular, circular) of the injection ports 12e, 12re of the discharge nozzles 12, 12r, cross-section areas (153 mm², 313 mm²) of the injection ports 12e, 12re, numbers (3, 4) of blades 3p . . . in the fluid operating portion 3, and numbers (4, 6) of blade groups G1 . . . . Note that the text along the horizontal axis, for example, the text "4 blades-4 G," indicates that the number of blades 3p . . . (number of blades) per group is four, and that the number of blade groups G1 . . . is four. As evident from these results, in terms of the shape of the injection port 12e, 12re of the discharge nozzle 12, 12r, a rectangular shape produces better results than a circular shape.

As described above, when the discharge nozzle 12 configured to discharge the fluid W is used for the fluid imparting means 11, the intended fluid W can be securely and effectively imparted on a target position in the vaned wheel for a turbine 1. At this time, when the rectangular shape is selected as the shape of the injection port 12e in the discharge nozzle 12, it is possible to optimize the shape of the injection port 12e in terms of motion conversion between the fluid W and the vaned wheel 1, because the shape of the injection port 12e can be selected from the viewpoint of improving the motion conversion efficiency when the fluid W collides with the blades 3p . . . and is converted into rotational movement of the vaned wheel 1.

Figure 17:
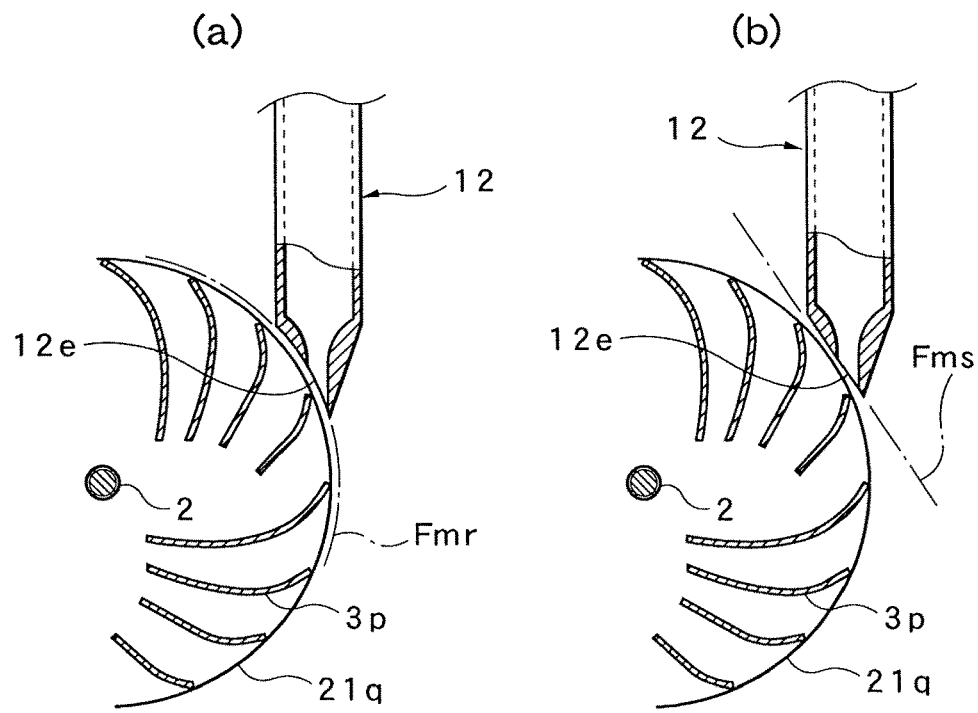
FIG. 17 is a cross-section plane view illustrating a modification example of a tip shape of the discharge nozzle of the vaned wheel for a turbine.

Note that the tip end shape of the injection port 12e as seen from the axial direction Fs of the rotation output axis 2 can be formed as illustrated in FIG. 17. Specifically, the tip end shape illustrated in FIG. 14 and FIG. 15 mentioned above is selected as a shape cut at a substantially perpendicular angle in the discharge direction. The tip end shape illustrated in FIG. 17 is selected as an inclined shape that follows the rotation locus of each of the blades 3p . . . . In this case, as illustrated in FIG. 17(a), the tip end shape may be an inclined shape that follows an arc line Fmr that is close to a peripheral circle of the support plate 21q . . . that is formed into a circle, or, as illustrated in FIG. 17(b), may be an inclined shape that follows a straight line Fms that is perpendicular to a normal line of the peripheral circle of the support plate 21q . . . that is formed into a circle. When the tip end shape is selected as such an inclined shape, it is possible to bring a fully open surface of the injection port 12e close to the vaned wheel for a turbine 1, and hence energy loss due to air resistance of the fluid W and other factors after the fluid W has been discharged from the discharge nozzle 12 can be reduced, and the shape can contribute to further improving the motion conversion efficiency.

Figure 13:
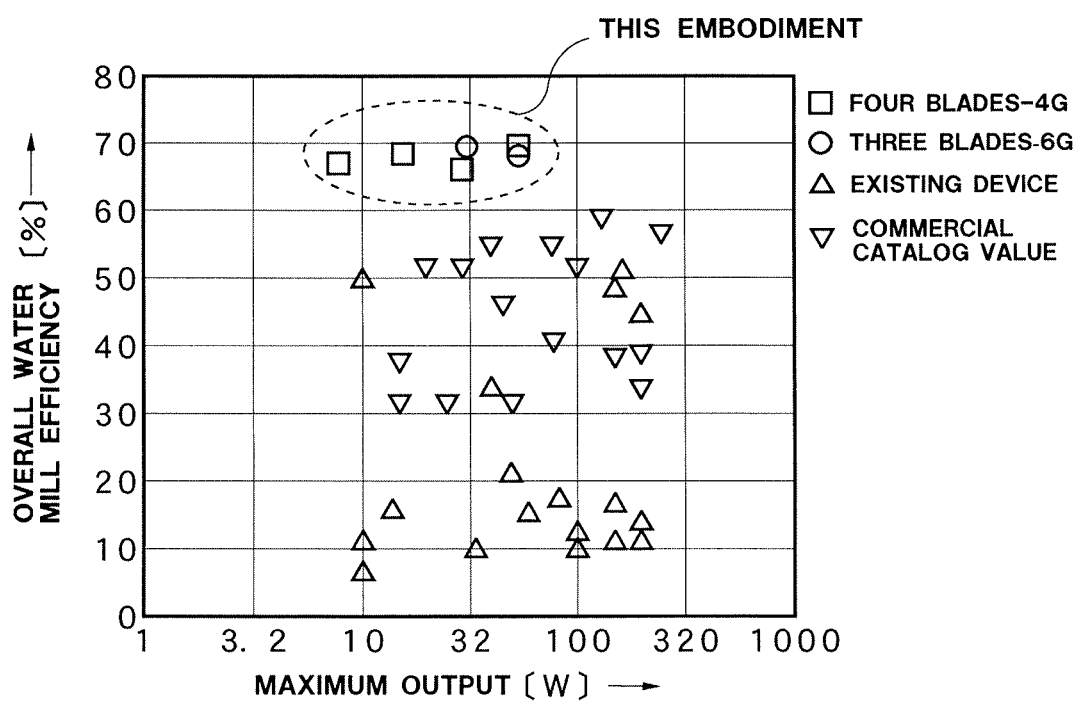
FIG. 13 is a characteristic graph showing vaned wheel conversion efficiency, comparing a power generation device using the vaned wheel for a turbine of the present invention, and a power generation device including an existing vaned wheel.

FIG. 13 shows overall efficiency characteristics by comparing the power generation device M that uses the vaned wheel 1 according to this embodiment that is configured as a small hydropower generation device, and a power generation device including an existing vaned wheel. In FIG. 13, the symbols "□" and "○" refer to the power generation device 1 according to this embodiment. The symbol "□" refers to a case in which a "4 blades-4G" fluid operating portion 3 was used, and the symbol "○" refers to a case in which a "3 blades-6G" fluid operating portion 3 was used. Specifically, the power generation device 1 according to this embodiment is included in the area enclosed by the dotted-line ellipse. This power generation device 1 achieves high efficiency, having a maximum output of approximately 5 W to 50 W, and an overall efficiency of approximately 70%. On the other hand, the symbols "△" and "▽" refer to conventional power generation devices. The symbol "△" refers to an example of an existing device, and the symbol "▽" refers to a commercial catalog value. Some of the conventional power generation devices had a maximum output of approximately 10 W to 300 W, and most had an overall efficiency of less than 60%. As seen from the above, the power generation device M using the vaned wheel 1 according to this embodiment is able to achieve high overall efficiency.

Next, a modification example of the vaned wheel for a turbine 1 according to this embodiment is described with reference to FIG. 18 to FIG. 20.

Figure 18:
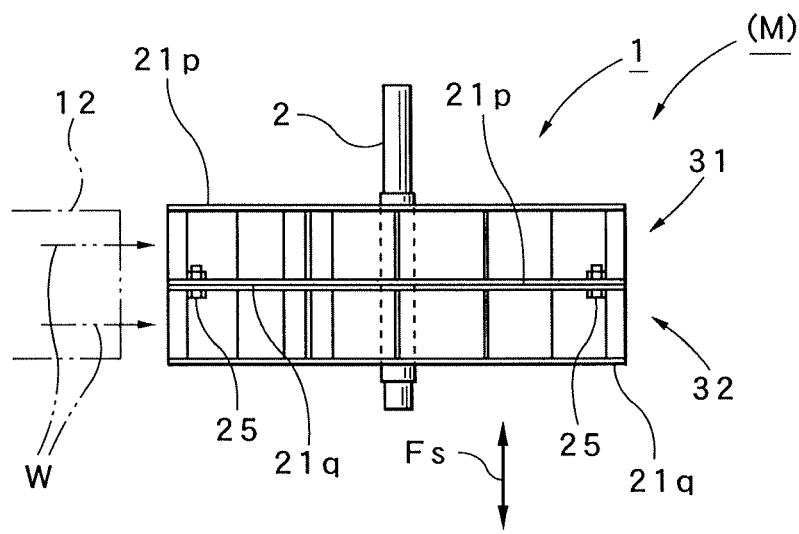
FIG. 18 is a side view illustrating a modification example of the vaned wheel for a turbine.
Figure 19:
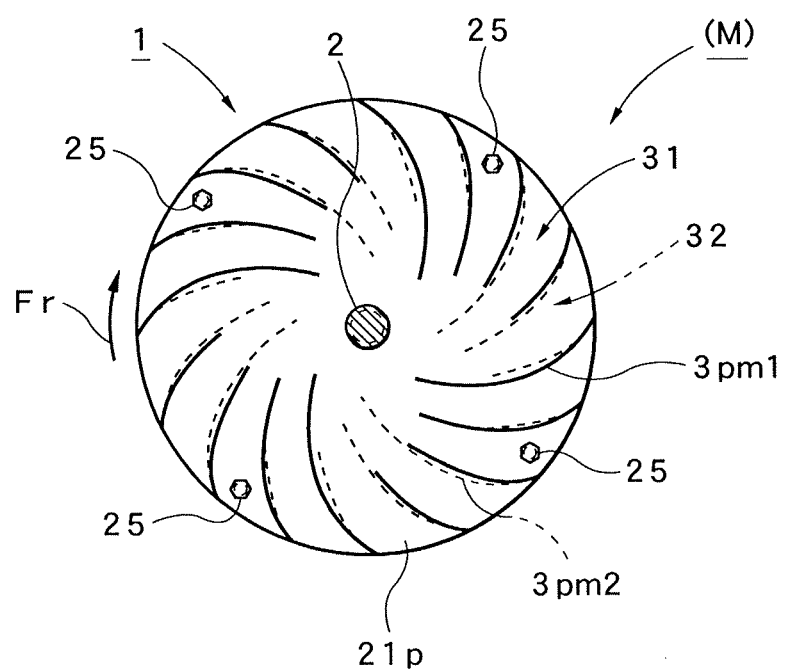
FIG. 19 is a plane view of the same.

The vaned wheel for a turbine 1 according to the modification example illustrated in FIG. 18 and FIG. 19 is configured by a combination of a plurality of fluid operating units 31, 32 . . . coupled to one another on the same axis when the fluid operating portion 3 is configured. Specifically, a plurality of (two in the illustrated example) fluid operating portion units 31 are prepared, in which the thickness thereof in the axial direction Fs of the standard fluid operating portion 3 illustrated in FIG. 14 is thinned (thinned to half in the illustrated example), and these units are coupled to one another on the same axis in the rotation output axis 2, in which one unit is the fluid operating portion unit 31, and the other unit is the fluid operating portion 32.

In this example, when coupling the fluid operating portion units 31 and 32 to one another, the units may be disposed such that relative positions of the units in the direction of rotation Fr match up, or may be disposed such that, as illustrated, relative phase angles of the units in the direction of rotation Fr are made to differ from one another. When making the relative phase angles in the direction of rotation Fr differ from one another, the maximum phase angle becomes 45° as illustrated, but the size of the relative phase angle to be set can be set to any size. Note that, in FIG. 19, the reference symbol 3pm1 refers to the main blade of the fluid operating portion unit 31, and the reference symbol 3pm2 refers to the main blade of the fluid operating portion unit 32.

In the vaned wheel for a turbine 1 according to the modification example described above, the number of fluid operating portion units 31, 32 . . . to be combined may be arbitrarily selected, and the thickness of each of the fluid operating portion units 31 . . . in the axial direction Fs can also be arbitrarily selected. In FIG. 18 and FIG. 19, the reference symbol 25 . . . refers to bolts and nuts used to couple the fluid operating portion units 31 and 32 to one another, that is, refers to bolts and nuts used to couple the support plate 21q of the fluid operating portion unit 31 and the support plate 21p of the fluid operating portion unit 32 to one another.

Therefore, in the vaned wheel for a turbine 1 according to the modification example illustrated in FIG. 18 and FIG. 19, the fluid operating portion 3 is configured by the combination of the plurality of fluid operating portion units 31, 32 that are coupled to one another on the same axis, and hence it is possible to obtain, easily and at low cost, various types of power generation devices M . . . based on the magnitude of their power generating capability. Further, in this case, the fluid operating portion units 31, 32 . . . can be disposed after making the relative phase angles thereof in the direction of rotation Fr differ from one another, and hence it is possible to substantially increase the number of main blades 3pm . . . , and reduce the force imparted by the fluid W on the main blades 3pm . . . during each collision, to thereby smoothly generate rotational force. The above-mentioned configuration can achieve further improvement of the motion conversion efficiency, and contribute to reducing noise/vibration.

Figure 20:
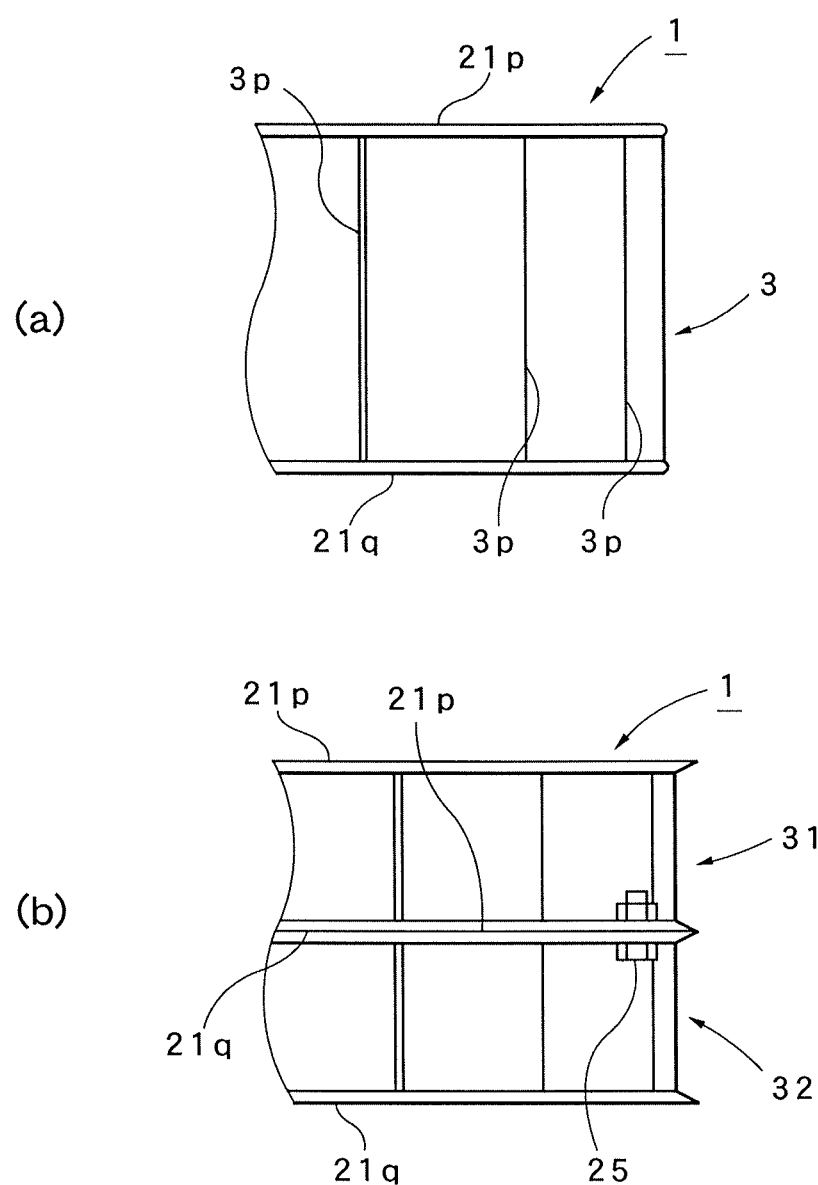
FIG. 20 is a side view illustrating another modification example of the vaned wheel for a turbine, in which one part has been omitted.

On the other hand, in the vaned wheel for a turbine 1 according to the modification example illustrated in FIG. 20, the cross-section of the outer peripheral edges of the support plates 21p, 21q that configure the vaned wheel for a turbine 1 is formed into a pointed shape or a round shape. FIG. 20(a) illustrates an example in which the vaned wheel for a turbine 1 is used singularly, and the cross-section of the outer peripheral edges of the support plates 21p, 21q is formed into the round shape. FIG. 20(b) illustrates an example in which the vaned wheel for a turbine 1 is formed as the fluid operating portion unit 31 . . . , two fluid operating portion units 31, 32 are coupled to one another for use, and the cross-section of the outer peripheral edges of the support plates 21p, 21q is formed into the pointed shape. Through forming the cross-section of the outer peripheral edges of the support plates 21p, 21q into the pointed shape or the round shape in this way, it is possible to reduce useless turbulence and scattering generated when the fluid W collides, and hence there is an advantage of contributing to preventing the motion conversion efficiency from lowering unnecessarily.

The best embodiments for carrying out the invention, including modified embodiments, are described in detail above. However, the present invention is not limited to these embodiments, and various arbitrary changes, additions, or deletions can be made to the configuration, shape, material, quantity, value, and other characteristics of details without departing from the scope of the invention.

For example, various types of force the fluid W, such as wind power, hydropower, steam, and gas can be used as force of the fluid W. Further, when configuring the fluid operating portion 3, the length of each of the auxiliary blades 3pa, 3pb . . . in the blade group G1 . . . is desirably set to gradually become shorter as the auxiliary blade 3pa, 3pb . . . approaches the front in the direction of rotation Fr, but this does not exclude setting various lengths other than the length to become gradually shorter, such as setting the length to be identical. Furthermore, the angle Rm formed between the normal line Lv that passes through the outer edge portion 3pmo of the main blade 3pm, and the chord line Lg of the main blade 3pm is desirably set within the range of from 12° to 22°, but this does not exclude other ranges. Note that, in terms of quantities, the number of blade groups G1 . . . is from four to six, and the number of blades 3p . . . in each of the groups G1 . . . is three to five in the examples above, but any other quantities that are best suited to the size, or other characteristics, of the vaned wheel 1 may be selected. Further, the intervals Lc . . . along the peripheral direction of the outer edge portion of each of the blades 3p . . . are desirably set to equal intervals, but this does not exclude a case in which the intervals Lc . . . are set to unequal intervals. On the other hand, the power generation device M has been exemplified above with the simplest configuration, but various auxiliary devices or additional mechanisms can be added thereto. Further, a case in which the discharge nozzle 12, which is configured to discharge the fluid W, is used as the fluid supply means 11 is used as an example above, but this does not exclude cases in which the shape of the injection port 12e in the discharge nozzle 12 has various other shapes, such as an elliptical shape. Furthermore, various fluid supply means 11 other than the discharge nozzle 12 that are similarly capable of imparting the fluid W can be applied to the present invention. Therefore, a waterway in a case in which the vaned wheel 1 is made to directly face the waterway, and the like, are also included in the fluid supply means 11. Note that the rotation output axis 2 of the vaned wheel 1, and the rotational input shaft 10s of the power generator 10 can also be coupled to one another using an acceleration and deceleration device (mechanism) such as a gear.

INDUSTRIAL APPLICABILITY

In particular, the vaned wheel for a turbine and power generation device according to the present invention can be applied to various power generation systems such as wind power generation systems and hydropower generation systems that generate small electric power. Note that the term "small power generation" does not define the capacity range of power, and is a concept that includes all scopes applicable to the present invention. Therefore, "small power generation" is a concept that encompasses various methods of power generation that are not defined by language, such as micro power generation, and mid-range power generation.

The invention claimed is:
1. A vaned wheel for a turbine, comprising:
a rotation output axis configured to output rotational force; and
a plurality of blades fixed at positions on the rotation output axis, and disposed at predetermined intervals in a circumferential direction around the rotation output axis, to which force of a fluid that flows through the vaned wheel for a turbine is imparted through making the plurality of blades face the fluid, each of the plurality of blades having a top edge, a bottom edge, an outer edge and an inner edge, wherein outer edges of each of the plurality of blades are positioned on a same circle S as seen from an axial direction of the rotation output axis, and are disposed at predetermined intervals along the circumferential direction, and, through dividing all of the blades into at least four or more blade groups that include a certain number, which is at least three or more, of the blades, the blade located in a rearmost portion of each blade group in a direction of rotation is selected as a main blade, and remaining blades are selected as auxiliary blades, the length of each of the auxiliary blades is set to be shorter than the length of the main blade, a corresponding inner edge of each of the blades is positioned to the front, in the direction of rotation, of a normal line that passes through the outer edge of each of the blades, and an extension line of a chord line that connects the outer edge and the inner edge of each of the blades to each other is set so as to intersect with the main blade that is adjacent to the front in the direction of rotation, wherein the plurality of blades is configured such that the shape of each of the blades as seen from the axial direction of the rotation output axis comprises a straight line, only a curved line, or a combination of a curved line and a straight line, and wherein an intermediate position thereof is expanded forward in the direction of rotation, and wherein the plurality of blades is configured such that the blades are disposed between a pair of opposing support plates formed into circles.

2. The vaned wheel for a turbine according to claim 1, wherein the force of the fluid comprises one of wind power and hydropower.

3. A power generation device, comprising:
the vaned wheel for a turbine of claim 2;
a power generator to which rotational force of the rotation output axis in the vaned wheel for a turbine is imparted; and
a fluid supplier configured to impart force of the fluid to the plurality of blades of the vaned wheel for a turbine.

4. The vaned wheel for a turbine according to claim 1, wherein the plurality of blades is configured such that a length distance from the outer edge to the inner edge of each of the auxiliary blades in the blade group is set to become shorter as the auxiliary blade approaches the front in the direction of rotation.

5. A power generation device, comprising:
the vaned wheel for a turbine of claim 4;
a power generator to which rotational force of the rotation output axis in the vaned wheel for a turbine is imparted; and
a fluid supplier configured to impart force of the fluid to the plurality of blades of the vaned wheel for a turbine.

6. The vaned wheel for a turbine according to claim 1, wherein the plurality of blades is configured such that the angle formed between the normal line that passes through the outer edge of the main blade, and the chord line of the main blade is selected to be within a range of from 12° to 22°.

7. A power generation device, comprising:
the vaned wheel for a turbine of claim 6;
a power generator to which rotational force of the rotation output axis in the vaned wheel for a turbine is imparted; and
a fluid supplier configured to impart force of the fluid to the plurality of blades of the vaned wheel for a turbine.

8. The vaned wheel for a turbine according to claim 1, wherein an interval between the inner edges of each of the blades in each of the blade groups is set to be narrower than an interval between corresponding outer edges, and wherein an angle formed between the normal line that passes through the outer edge of an arbitrary auxiliary blade in the blade group, and the chord line of the arbitrary auxiliary blade is set to be larger than an angle formed between the normal line that passes through the outer edge of the main blade in the blade group, and the chord line of the main blade.

9. The vaned wheel for a turbine according to claim 1, wherein the plurality of blades is configured such that a cross-section shape of the outer edge of some or all of the blades is selected as a pointed shape or a round shape.

10. The vaned wheel for a turbine according to claim 1, wherein the plurality of blades is used singularly, or is configured of groups of pluralities of blades, and wherein the groups of pluralities of blades are coupled to one another on the same axis.

11. The vaned wheel for a turbine according to claim 10, wherein the groups of pluralities of blades are disposed after making the relative phase angles thereof in the direction of rotation differ from one another.

12. The vaned wheel for a turbine according to claim 1, wherein the support plates have a cross-section of the outer peripheral edge formed into a pointed shape or a round shape.

13. A power generation device, comprising:
the vaned wheel for a turbine of claim 1;
a power generator to which rotational force of the rotation output axis in the vaned wheel for a turbine is imparted; and
a fluid supplier configured to impart force of the fluid to the plurality of blades of the vaned wheel for a turbine.

14. The power generation device according to claim 13, wherein the fluid supplier comprises a discharge nozzle configured to discharge the fluid.

15. The power generation device according to claim 14, wherein the discharge nozzle comprises an injection port for which a rectangular shape is selected.

16. The power generation device according to claim 14, wherein the discharge nozzle has a tip end shape of the injection port, as seen from the axial direction of the rotation output axis, selected as an inclined shape that follows a rotation locus of each of the plurality of blades in the vaned wheel for a turbine.

17. The vaned wheel for a turbine according to claim 1, wherein each of the plurality of blades is spaced radially outwardly from the rotation output axis.

* * * * *